(12) United States Patent
Bachelder et al.

(10) Patent No.: US 7,976,310 B2
(45) Date of Patent: Jul. 12, 2011

(54) AUTOROTATION FLIGHT CONTROL SYSTEM

(75) Inventors: Edward N. Bachelder, Redondo Beach, CA (US); Dong-Chan Lee, Lawndale, CA (US); Bimal L. Aponso, Rancho Palos Verdes, CA (US)

(73) Assignee: Systems Technology, Inc., Hawthorne, CA (US)

( * ) Notice: Subject to any disclaimer, the term of this patent is extended or adjusted under 35 U.S.C. 154(b) by 1493 days.

(21) Appl. No.: 11/332,078

(22) Filed: Jan. 13, 2006

(65) Prior Publication Data

US 2007/0164167 A1 Jul. 19, 2007

(51) Int. Cl.
 *G09B 9/08* (2006.01)
(52) U.S. Cl. ......................................... 434/33
(58) Field of Classification Search ............... 434/29–71; 244/190, 17.13; 703/8; 340/946, 973–975; 701/6

See application file for complete search history.

(56) References Cited

U.S. PATENT DOCUMENTS

| 4,368,517 | A * | 1/1983 | Lovering | 701/16 |
| 6,798,423 | B2 | 9/2004 | Wilkins, Jr. et al. | |
| 6,917,908 | B2 * | 7/2005 | Williams | 703/8 |
| 2004/0010354 | A1 * | 1/2004 | Nicholas et al. | 701/4 |

OTHER PUBLICATIONS

Swenson, Harry; Zelenka, Richard; Hardy, Gordon; Dearing, Munro;—Simulation Evaluation of a Low-Altitude Helicopter Flight Guidance System for a Helmet Mounted Display—NASA—Feb. 1992.*

* cited by examiner

*Primary Examiner* — Xuan M. Thai
*Assistant Examiner* — Timothy Musselman
(74) *Attorney, Agent, or Firm* — Lewis Brisbois Bisgaard & Smith LLP

(57) ABSTRACT

The present invention provides computer implemented methodology that permits the safe landing and recovery of rotorcraft following engine failure. With this invention successful autorotations may be performed from well within the unsafe operating area of the height-velocity profile of a helicopter by employing the fast and robust real-time trajectory optimization algorithm that commands control motion through an intuitive pilot display, or directly in the case of autonomous rotorcraft. The algorithm generates optimal trajectories and control commands via the direct-collocation optimization method, solved using a nonlinear programming problem solver. The control inputs computed are collective pitch and aircraft pitch, which are easily tracked and manipulated by the pilot or converted to control actuator commands for automated operation during autorotation in the case of an autonomous rotorcraft. The formulation of the optimal control problem has been carefully tailored so the solutions resemble those of an expert pilot, accounting for the performance limitations of the rotorcraft and safety concerns.

13 Claims, 17 Drawing Sheets

Bell 206L-4 single rotor helicopter

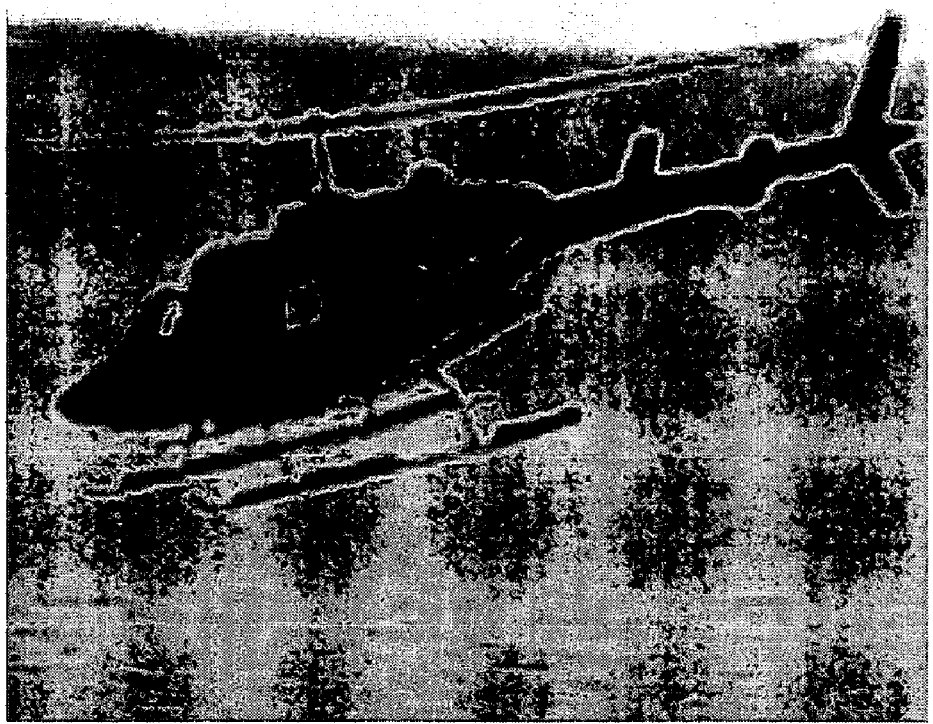
Figure 1. Bell 206L-4 single rotor helicopter

(a)
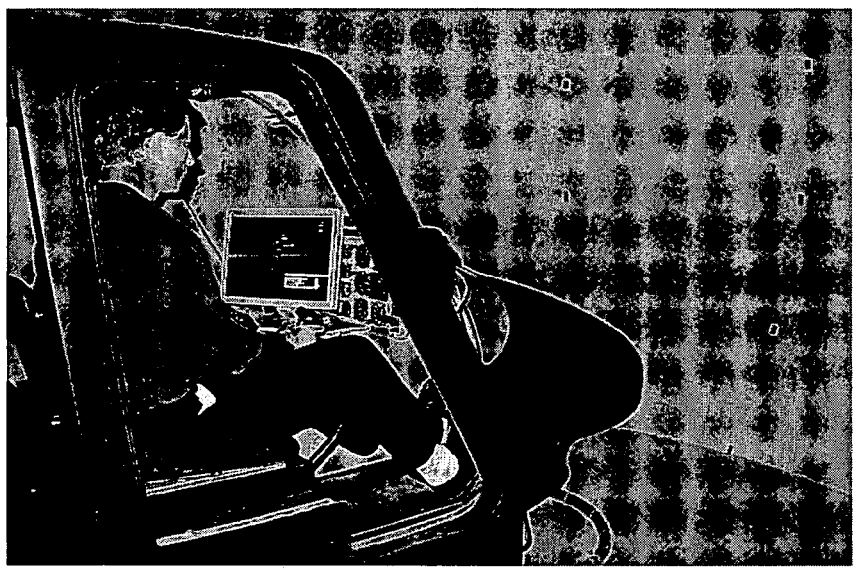
(b)
Figure 2. Frasca International Bell 206 Flight Training Device (FTD)

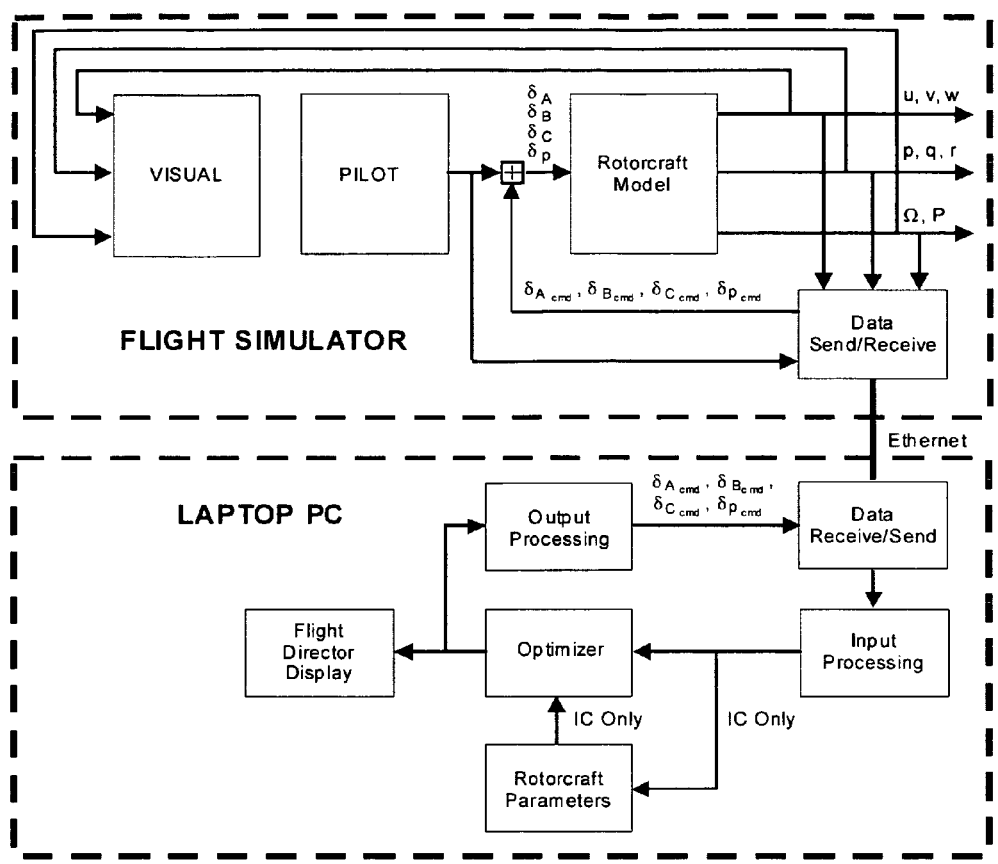
Figure 3. Interface between the optimal guidance and the FTD

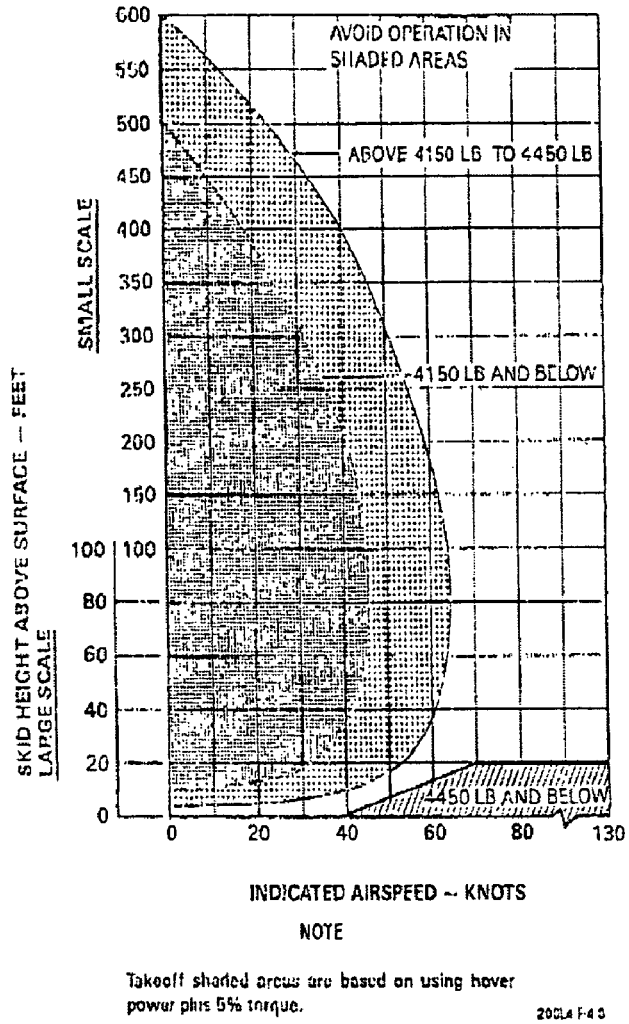
Figure 4. Height-Velocity diagram for the Bell 206L-4 Helicopter Results

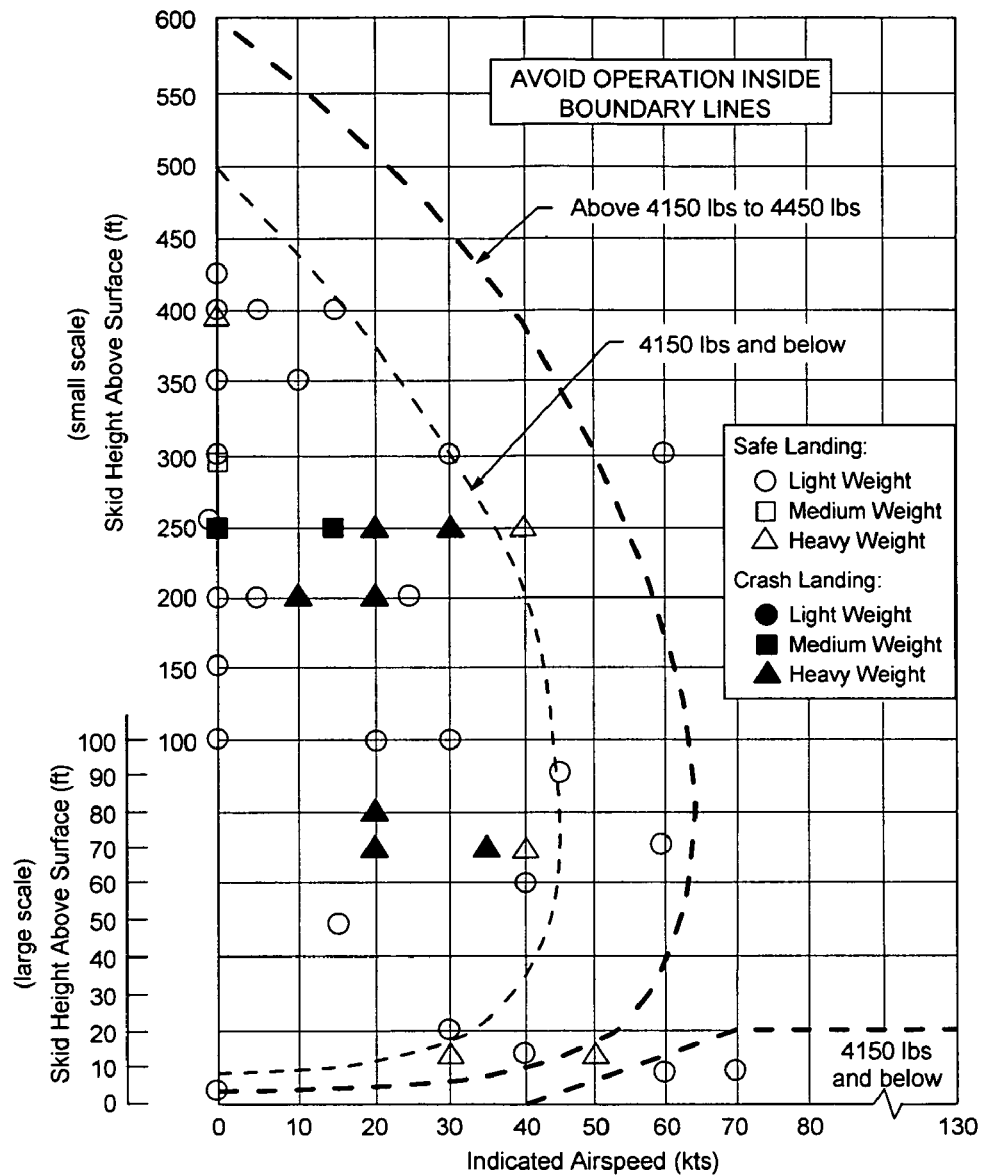
Figure 5. Automated autorotation flight conditions evaluated

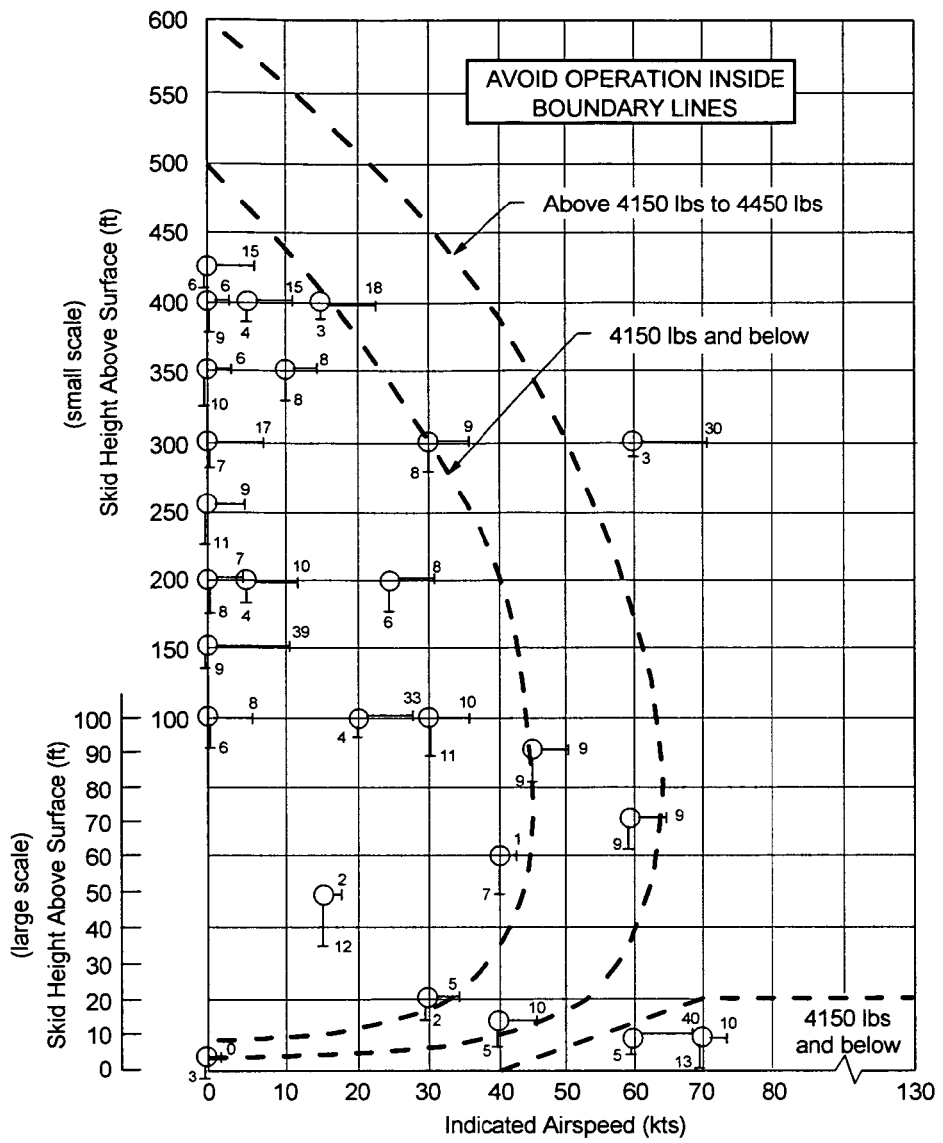
Figure 6 Touchdown ground-speed and sink-rate (light weight condition)

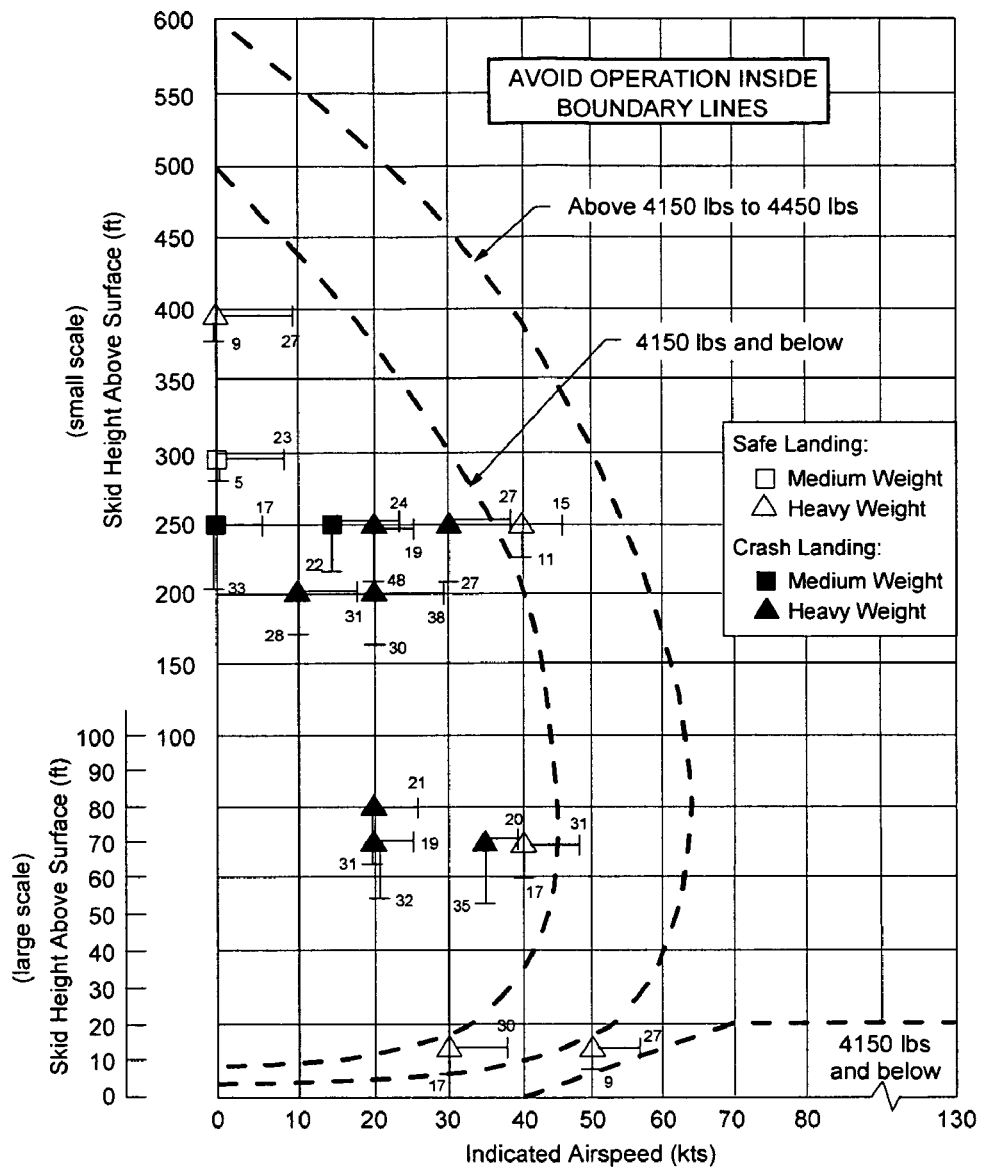
Figure 7. Touchdown ground-speed and sink-rate
(medium and heavy weight conditions)

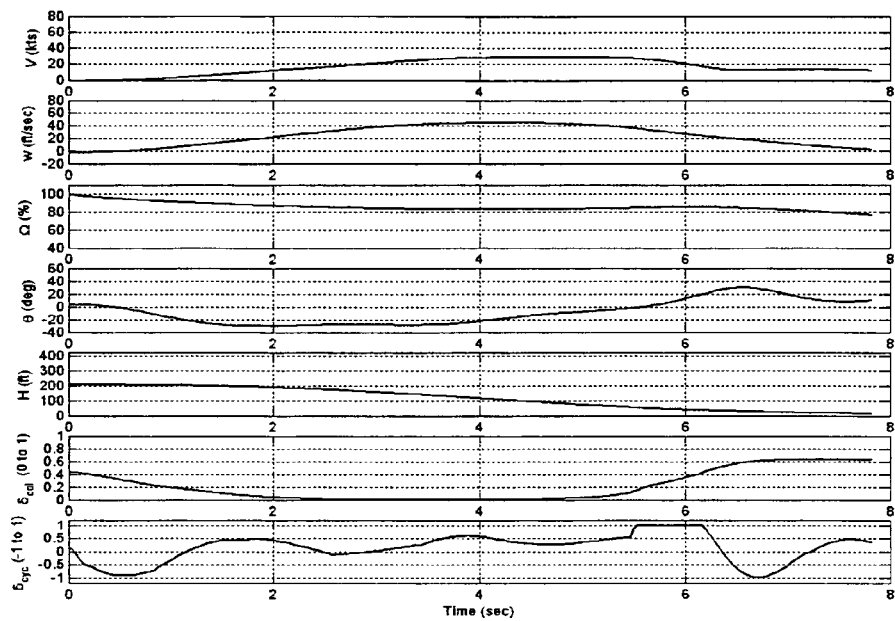
Figure 8. Automatic autorotation from 200ft/0kts; light weight condition (2900 lbs)

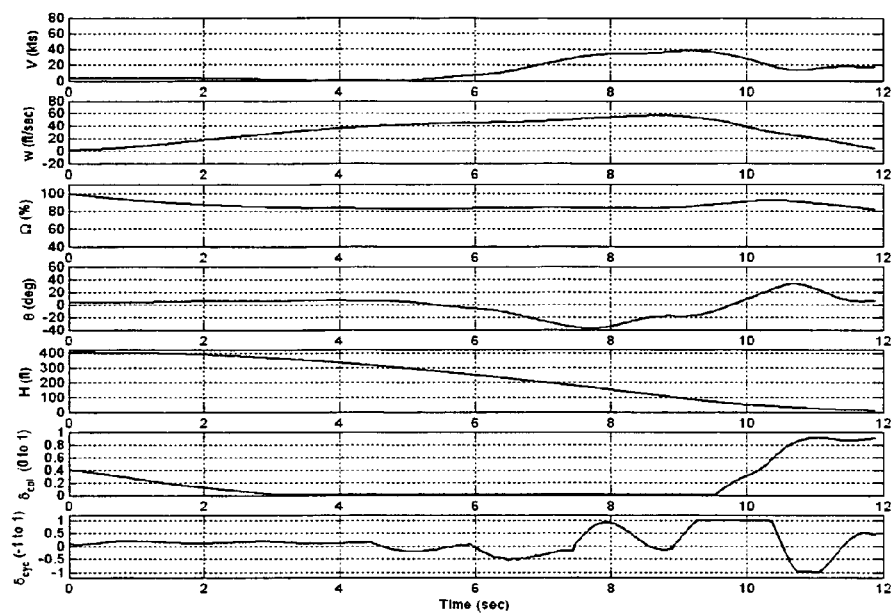
Figure 9. Automatic autorotation from 400ft/0kts; light weight condition (3100 lbs)

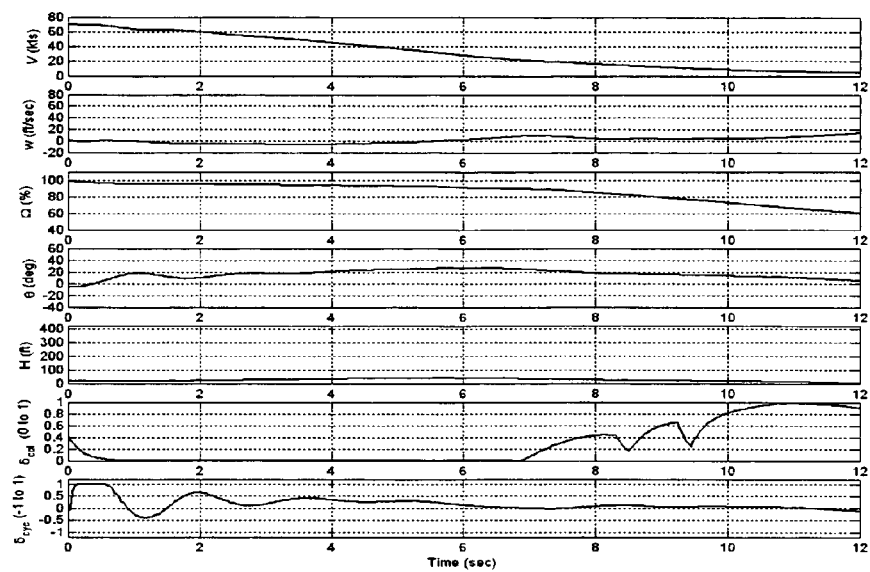
Figure 10. Automatic autorotation from 20ft/70kts; light weight condition (3085 lbs)

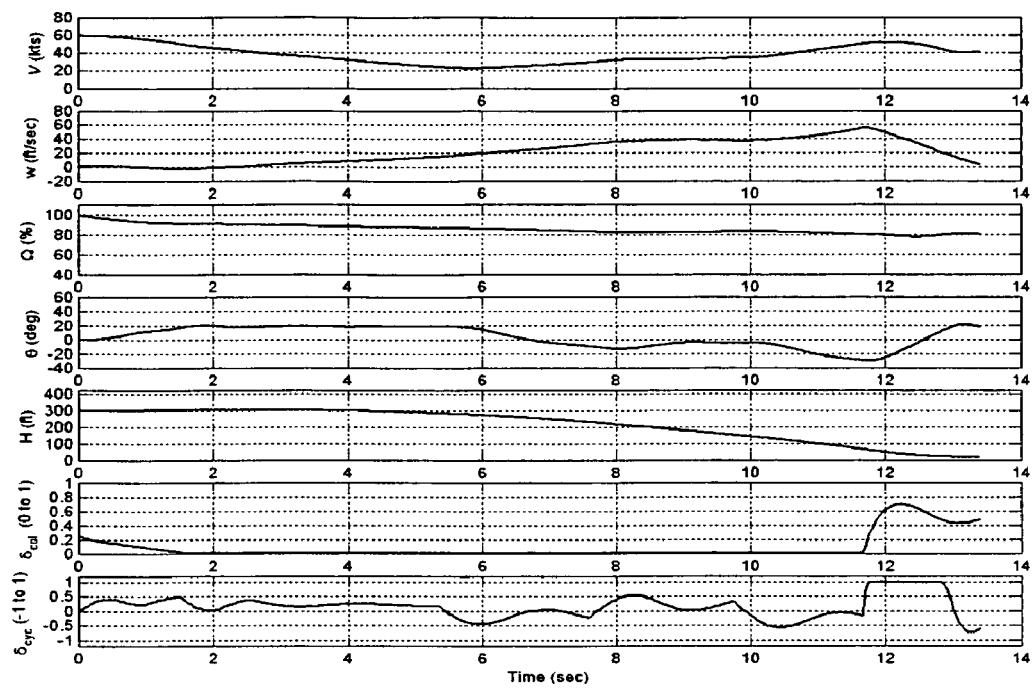
Figure 11. Automatic autorotation from 300ft/60kts; light weight condition (3085 lbs)

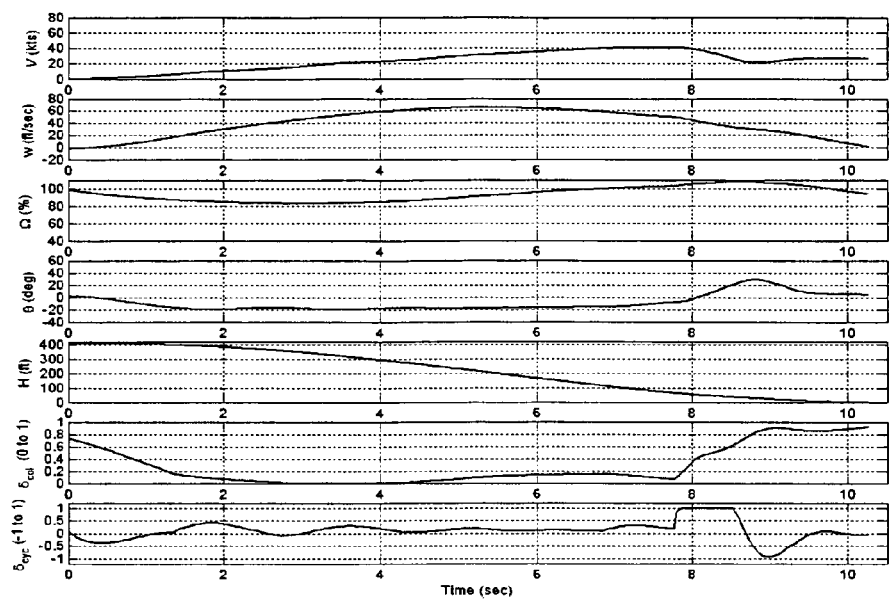
Figure 12. Automatic autorotation from 400ft/0kts; heavy weight condition (4440 lbs)

AUTOROTATION FLIGHT CONTROL SYSTEM

The United States Government has a paid-up license in this invention and the right in limited circumstances to require the patent owner to license others on reasonable terms as provided for by the terms of NASA Contracts NAS2-02008 and NAS2-02096 awarded by the NASA, Ames Research Center, Moffett Field, Calif.

FIELD OF THE INVENTION

The present invention relates to a methodology using optimal control for application to the time critical maneuvering of dynamic systems including vehicles such as rotorcraft. The methodology is implemented in a computer-based system for calculating and displaying optimal-control input commands to a human-operator for autorotation flight control of a rotorcraft and is adapted for training helicopter pilots in a flight simulator on safe maneuvering in time critical situations involving total engine power failure (autorotation) and partial power failure. The methodology can also be used for automated guidance of dynamic systems including vehicles such as rotorcraft in time critical maneuvering situations and in an automated system that will provide the highest likelihood of a safe landing if the pilot is incapacitated or if the vehicle is unmanned.

BACKGROUND ART

A series of analytical and experimental work has been done to understand and describe the nature of the dynamics and pilot's recovery techniques in rotorcraft's power failure. Johnson (Ref. 1) analytically described the dynamics of rotorcraft's autorotation. Lee (Refs. 2, 3), Zhao (Refs. 4-6), Carlson (Refs. 7-10), and Okuno (Refs 11, 12) investigated the application of constrained optimization to investigate the safe operational envelopes for autorotation and reduced-power situations for a variety of rotorcraft ranging from single-engine (OH-58A, Refs. 2-3) to multi-engine, for instance UH-60A and Bell M430, (Refs. 4-6, 8, 11, 12, 10) to tilt-rotor (Refs. 7, 9, 10). Johnson (Ref. 1) investigated the autorotation of a helicopter from a hover, and Lee (Refs. 2, 3) refined the problem formulation by adding inequality constraints for thrust and vertical velocity. Lee postulated that the "avoid" regions in the height-velocity (H-V) restriction curve could be substantially reduced if optimal pilot inputs were used during autorotation. References 2 and 3 used a point-mass model of an OH-58A helicopter and the cost function was a weighted sum of the squared horizontal and vertical components of the helicopter velocity at touchdown. The point-mass model had two degrees-of-freedom (vertical and horizontal velocity) with an additional rotor speed degree-of-freedom. The inputs (horizontal and vertical thrust) required to minimize the cost function were computed using nonlinear optimal control theory. The correlation between flight data and the optimal results established the adequacy of the use of a point mass model in the optimal helicopter landing study (Ref. 2, 3). References 2 and 3 also validated the method by comparing the optimal profiles (helicopter states and controls) with available autorotation flight-test data for the OH-58A. A unique feature of the Refs. 2 and 3 formulation was the addition of path inequality constraints on components of both the control and the state vectors. The control variable inequality constraint is a reflection of the limited amount of thrust that is available to the pilot in the autorotation maneuver without stalling the rotor. The state variable inequality constraint is an upper bound on either the vertical sink rate of the helicopter or the rotor angular speed during descent. "Slack" variables were employed to convert these path inequality constraints into path equality constraints. The resultant two-point boundary-value problem with path equality constraints was successfully solved using the Sequential Gradient Restoration Algorithm (SGRA). With bounds on the control and state vectors, the optimal solutions obtained will realistically reflect the limitations of the helicopter and its pilot. The model in Ref. 2 and 3 used assumed zero-wind, vertical plane motion, and zero-slip flight. Zhao (Ref 4-6) extended the work by Lee (Ref. 2, 3) to investigate the takeoff and landing trajectories of a dual-engine helicopter in the event of a single engine failure. Zhao also used the SGRA for computing the optimal trajectories and used different constructions for the objective (cost) function to investigate optimal profiles for continued and rejected landings and takeoffs in the event of a single engine failure. In addition to touch-down velocity, horizontal distance was also included in the objective function to examine the implications of an engine failure on the safe return and landing or continued flight of the helicopter. A point-mass model of a UH-60A helicopter was used in this work with improvements to the model to include engine torque and a ground-effect model. Carlson (Ref. 7-10) launched from the previous body of work and used optimal control theory to investigate the unsafe (avoid) regions of the H-V envelope in the event of single-engine failure as well as complete engine failure situations in a civil tiltrotor aircraft and a dual engine helicopter. A relatively sophisticated three degree-of-freedom (vertical and horizontal velocity and pitch attitude) rotorcraft model was used with an added rotor speed degree-of-freedom and a non-linear aerodynamic model of the XV-15 tilt-rotor aircraft and the Bell M430 helicopter. An important contribution of the Refs. 7-10 work was the improvement in the optimization method. The Ref. 7-10 work demonstrated that the SGRA optimization method was not robust in the face of more complex problem formulations. The Refs. 7-10 work successfully implemented a direct method of optimization (Ref. 13) where the continuous two-point boundary value problem is discretized into a parameter optimization problem. The optimization used a well-established and mature nonlinear programming algorithm that is commercially available (Refs. 14, 15). The present invention applies a similar strategy to compute the optimal control inputs and resulting flight path for rotorcraft autorotation.

LIST OF REFERENCES (1) Wayne Johnson, "Helicopter Optimal Descent and Landing after Power Loss," NASA Technical Memorandum, NASA™ 73244, May 1977.

(2) Allan Y. Lee, "Optimal Landing of a Helicopter in Autorotation," Ph.D. Dissertation, Stanford University, July 1985.

(3) Allan Y. Lee, Arthur E. Bryson, Jr., and William S. Hindson, "Optimal Landing of a Helicopter in Autorotation," Journal of Guidance, Vol. 11, No. 1, pp 7-12, January-February 1988.

(4) Y. Zhao and R. T. N. Chen, "Critical Consideration for Helicopters During Runway Takeoffs," Journal of Aircraft, Vol. 32, No. 4, pp 773-781, July-August 1995.

(5) Y. Zhao, Ali A. Jhemi, and R. T. N. Chen, "Optimal Vertical Takeoff and Landing Helicopter Operation in One Engine Failure," Journal of Aircraft, Vol. 33, No. 2, pp 337-346, March-April 1996.

(6) R. T. N. Chen and Y. Zhao, "Optimal Trajectories for the Helicopter in One-Engine-Inoperative Terminal-Area Operations," Presented at the FVP Symposium on "Advances in Rotorcraft Technology", Ottawa, Canada, May 1996.
(7) Eric B. Carlson, "Optimal Tiltrotor Aircraft Operations During Power Failure," Ph.D. Dissertation, University of Minnesota, July 1999.
(8) Eric B. Carlson, "An Analytical Methodology for Category A Performance Prediction and Extrapolation," Presented at the American Helicopter Society 57th Annual Forum, Washington, D.C., May 9-11, 2001.
(9) Eric B. Carson and Y. Zhao, "Prediction of Tiltrotor Height-Velocity Diagrams Using Optimal Control Theory," Journal of Aircraft, Vol. 40, No. 5, pp 896-905, September-October 2003.
(10) Ali A. Jhemi, Eric B. Carlson, Y. Zhao, and R. T. N. Chen, "Optimization of Rotorcraft Flight Following Engine Failure," Journal of American Helicopter Society, Vol. 49, No. 2, pp 117-126, April 2004.
(11) Y. Okuno and Keiji Kawachi, "Optimal Takeoff of a Helicopter for Category A V/STOL Operation," Journal of Aircraft, Vol. 30, No. 2, pp 235-240, March-April 1993.
(12) Y. Okuno, Keiji Kawachi, Akira Azuma, and Shigeru Saito, "Analytical Prediction of Height-Velocity Diagram of a Helicopter Using Optimal Control Theory," Journal of Guidance, Vol. 14, No. 2, pp 453-459, March-April 1991.
(13) C. R. Hargraves and S. W. Paris, "Direct Trajectory Optimization Using Nonlinear Programming and Collocation," Journal of Guidance, Vol. 10, No. 4, pp 338-342, July-August 1987.
(14) Philip E. GILL, Walter MURRAY, Michael A. SAUNDERS, and Margaret H. Wright, "USER'S GUIDE FOR NPSOL 5.0," Technical Report SOL 86-1, Stanford University, Revised Jul. 30, 1998.
(15) Philip E. GILL, Walter MURRAY, and Michael A. SAUNDERS, "USER'S GUIDE FOR SNOP Version 6.0," Stanford University, December 2002.
(16) Watts, Joseph C., Gregory W. Condon, and John V. Pincavage, "Height-Velocity Test, OH-58A Helicopter," USAASTA Project No. 69-16, June 1971.
(17) Dooley, L. W. and Yeary, R. D., "Flight Test Evaluation of the High Inertia Rotor System," USARTL-TR-79-9, June 1979.
(18) E. N. Bachelder and Bimal L. Aponso "Using Optimal Control for Rotorcraft Autorotation Training," Proceedings of the American Helicopter Society 59th Annual Forum, Phoenix, Ariz., May 6-8, 2003.

SUMMARY DISCLOSURE OF THE INVENTION

The autorotation capability of helicopters following engine power failure is a unique feature that can provide a means for executing a safe landing. However, the autorotation maneuver can require considerable skill and proficiency that is not normally acquired through nominal flight training.

In most autorotation training, pilots receive in-flight instruction on autorotation technique using initial conditions that are well outside of the hover-velocity (H-V) restriction curve of the helicopter flown—and the engine remains powered. Additionally, the entry conditions (altitude, relative wind direction, and especially airspeed) are usually consistent from one practice autorotation to another (within model and instructor). Autorotation training in a simulator is an infrequent event for most pilots, and even the best simulators poorly reproduce the cues required during an actual autorotation. The primary utility of simulators as an autorotation training aid, therefore, is to develop a proficient instrument scan procedure. The likelihood of a successful autorotation performed under actual instrument conditions, however, is extremely remote. Clearly rotary pilots have few resources to help them train toward and maintain autorotation proficiency, so that the autorotation is usually regarded as a 'take what comes and pray' maneuver.

In one aspect the present invention comprises the application of a real-time trajectory optimization method for guiding a manned rotorcraft, an autonomous unmanned rotorcraft, or a remote operator of an unmanned rotorcraft, through an autorotation in the event of partial or total loss of power. The invention provides for safe landing of such a rotorcraft. Further, successful autorotations may be performed from well within the manufacturer's designated unsafe operating area of the height-velocity profile of a rotorcraft or helicopter by employing the fast and robust optimal algorithm of the present invention. The invention applies nonlinear constrained optimal control theory to solve for a vehicle's trajectory and the required control inputs to accomplish a successful autorotation. The guidance algorithm of the present invention generates optimal trajectories and control commands via the direct-collocation optimization method, solved using a commercially available nonlinear programming problem solver. The control inputs computed by optimal control formulation are collective pitch and aircraft pitch, which are easily manipulated by an onboard or remote pilot or converted to collective and longitudinal cyclic commands in the case of an autonomous unmanned rotorcraft. The formulation of the optimal control problem has been carefully tailored to enable the solutions to resemble those of an expert pilot, accounting for the performance limitations of the rotorcraft as well as safety concerns. A preview of the commanded flight control input suite, which is dynamically updated as the vehicle state changes in time, is provided to the pilot of a manned or remotely operated unmanned rotorcraft through an intuitive visual display. In the case of an autonomous unmanned rotorcraft the present invention provides commands for control motion directly through a link to a conventional commercially available autopilot.

In another aspect the present invention comprises a novel training methodology and a system that takes advantage of automation's potential as a high-speed decision aid and the strengths of human pattern recognition and conditioning. In this embodiment the invention is coupled with a flight simulator to train pilots across a range of rotorcraft platforms. Using the invention's command preview display and other display functions incorporated with a flight simulator a pilot trainee should be able to execute numerous maneuvers previously considered outside the operational envelope, in addition to performing 'standard' emergencies with a high degree of control consistency and accuracy.

BRIEF DESCRIPTION OF THE DRAWINGS

FIG. 1 is a depiction of a single rotor helicopter.
FIGS. 2a and 2b depict a Frasca International Bell 206 Flight Training Device (FTD).
FIG. 3 is a block diagram depicting the interface between the optimal guidance and the FTD.
FIG. 4 is a Height-Velocity diagram for the Bell 206L-4 Helicopter Results.
FIG. 5 is a diagram depicting the Automated autorotation flight conditions evaluated.
FIG. 6 is a diagram depicting the touchdown ground-speed and sink-rate (light weight condition).
FIG. 7 is a diagram depicting the touchdown ground-speed and sink-rate (medium and heavy weight conditions).

FIG. 8 is a diagram depicting a time history for selected flight and control parameters for simulated automatic autorotation from 200 ft/0 kts; light weight condition (2900 lbs).

FIG. 9 is a diagram depicting a time history for selected flight and control parameters for simulated automatic autorotation from 400 ft/0 kts; light weight condition (3100 lbs).

FIG. 10 is a diagram depicting a time history for selected flight and control parameters for simulated automatic autorotation from 20 ft/70 kts; light weight condition (3085 lbs).

FIG. 11 is a diagram depicting a time history for selected flight and control parameters for simulated automatic autorotation from 300 ft/60 kts; light weight condition (3085 lbs).

FIG. 12 is a diagram depicting a time history for selected flight and control parameters for simulated automatic autorotation from 400 ft/0 kts; heavy weight condition (4440 lbs).

Figure 13:
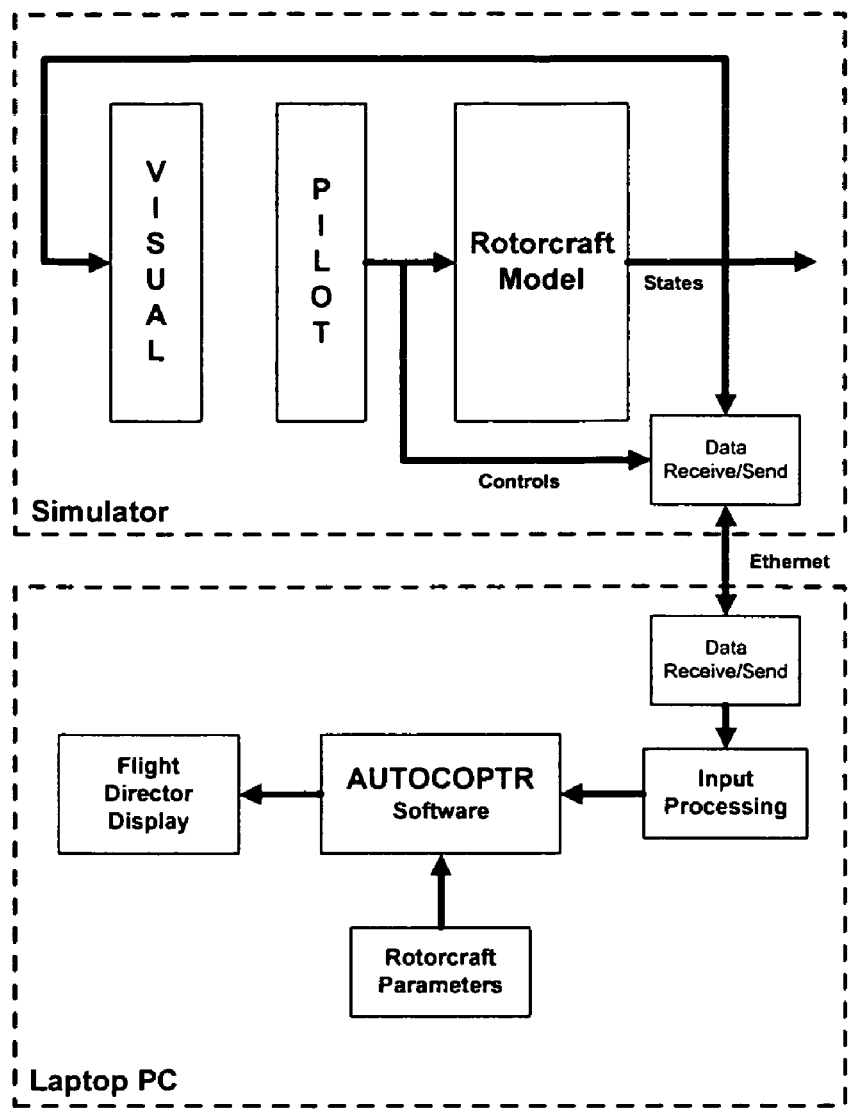
FIG. 13 is a diagram depicting a schematic illustration of a first embodiment of the current invention adapted for training rotorcraft pilots on a flight simulator.

INDUSTRIAL APPLICABILITY OF THE INVENTION AND MODES FOR CARRYING OUT THE INVENTION

The present invention is directed to systems for autorotation flight control, and in particular to the computer implemented system that provides directions for controlling the flight of helicopters or of other rotorcraft upon loss of power to maximize the likelihood of a safe landing. The present invention may take the form of various embodiments, such as for example in a system adapted for a flight simulator for single engine, single rotor helicopters, a flight simulator for multiple engine, single or multiple rotor helicopters or a flight simulator for other rotorcraft. Embodiments of the present invention may also take the form of control systems for use in real working helicopters or other rotorcraft (as opposed to a simulator). When adapted for use in piloted working aircraft, the system is be adapted to provide display information for controlling the flight of the aircraft to maximize the likelihood of safe landing and/or is be adapted to provide automatic control inputs to the aircraft for such landings. When adapted for use in drones or other aircraft without pilots the system is be adapted for providing remote display for remote control of the aircraft and/or for automatic control inputs to the aircraft.

In the following description, numerous specific details are set forth to provide a more thorough description of embodiments of the invention. In light of the present disclosure, other embodiments will become obvious to those of ordinary skill in the art and such embodiments are within the scope of the present invention. It will be apparent, however, to one skilled in the art, that the invention may be practiced without these specific details. In other instances, well known features have not been described in detail so as not to obscure the invention. Except as noted herein, common components and connections, identified by common reference designators function in like manner.

In the description and included mathematical expressions the symbols used have the definitions or meanings stated in the following key to nomenclature:

| | |
|---|---|
| a | rotor blade two-dimensional lift curve slope (rad$^{-1}$) |
| $C_P$ | power coefficient |
| $C_T$ | thrust coefficient |
| $(C_x, C_z)$ | (horizontal, vertical) component of thrust coefficient |
| $c_{d0}$ | mean profile drag coefficient of rotor blades |
| $f_e$ | equivalent flat plate area for fuselage (ft$^2$) |
| $f_G$ | ground effect factor |
| $f_I$ | induced velocity factor |
| g | gravitational acceleration (ft/s$^2$) |
| (h, d) | (vertical, horizontal) position (ft) |
| $H_{hub}$ | rotor hub height when helicopter is on the ground (ft) |
| $I_R$ | polar moment of inertia of the main rotor blade (slug-ft$^2$) |
| J | cost function |
| $K_{ind}$ | induced power factor |
| m | mass of helicopter (slugs) |
| $P_S$ | available shaft power (lbf · ft/s) |
| $P_{res}$ | residual shaft power (lbf · ft/s) |
| R | main rotor radius (ft) |
| $t_f$ | estimated flight time (s) |
| (u, w) | (horizontal, vertical) velocity components (ft/s) |
| α | tip path plane angle (rad) |
| γ | weighting factor in cost function |
| $\delta_c$ | collective pitch angle position (rad) |
| $\delta_{col}$ | normalized collective pitch angle position |
| $\delta_{cyc}$ | normalized longitudinal cyclic position |
| η | helicopter power efficiency factor |
| λ | rotor inflow ratio |
| μ | rotor advance ratio |
| ρ | air density (slugs/ft$^3$) |
| σ | rotor solidity ratio |
| $\tau_p$ | turboshaft engine time constant (s) |
| θ | aircraft pitch angle (rad) |
| Ω | main rotor angular speed (rpm) |
| v | rotor induced velocity (ft/s) |
| $v_h$ | induced velocity at hover (ft/s) |
| ( )$_0$ | initial values at engine failure |
| ( )$_{max}$ | maximum value allowed |
| ( )$_{min}$ | minimum value allowed |
| ( )$_{ref}$ | reference value |
| ( )$_{nom}$ | reference value |

The Rotorcraft Model

The rotorcraft equations of motions are detailed below.

$$m\dot{w} = mg - \rho(\pi R^2)(\Omega R)^2 C_z - \frac{1}{2}\rho f_e w \sqrt{u2 + w2} \tag{1}$$

$$m\dot{u} = \rho(\pi R^2)(\Omega R)^2 C_x - \frac{1}{2}\rho f_e u \sqrt{u2 + w2} \tag{2}$$

$$I_R \Omega \dot{\Omega} = P_S - \frac{1}{\eta}\rho(\pi R^2)(\Omega R)^2 C_P \tag{3}$$

$$\dot{h} = -w \tag{4}$$

$$\dot{d} = u \tag{5}$$

$$\dot{P}_S = \frac{1}{\tau_p(P_{res} - P_S)} \tag{6}$$

where, $P_{res}$ is the steady-state power remaining following a throttle cut during a simulated engine failure.

In Eq. (6) a first order response is assumed for turboshaft engines (Ref. 4). The coefficients are defined as:

$$C_P = \frac{1}{8}\sigma c_d + C_T \lambda \tag{7}$$

$$C_x = C_T \sin\alpha \quad (8)$$

$$C_z = C_T \cos\alpha \quad (9)$$

$\lambda$ is the inflow ratio defined as (Ref. 4):

$$\lambda = \frac{u\sin\alpha - w\cos\alpha + v}{\Omega R} \quad (10)$$

and the induced velocity $v$ is approximated as:

$$v = K_{ind} v_h f_I f_G \quad (11)$$

$v_h$ is the reference induced velocity at hover defined as:

$$v_h = (\Omega R)\sqrt{\left(\frac{C_T}{2}\right)} \quad (12)$$

The induced velocity parameter $f_I$ is defined as the ratio of the actual induced velocity to the reference velocity $v_h$. The following expression is used to determine $f_I$:

$$f_I = \begin{cases} 1/\sqrt{(b^2 + (a+f_I)^2)} & \text{if } (2a+3)^2 + b^2 \geq 1.0 \\ a(.373a^2 + .598b^2 - 1.991) & \text{otherwise} \end{cases} \quad (13)$$

where, a and b are defined as:

$$a = \frac{u\sin\alpha - w\cos\alpha}{v_h} \quad (14)$$

$$b = \frac{u\cos\alpha + w\sin\alpha}{v_h} \quad (15)$$

The term $f_G$ accounts for the decrease in induced velocity due to ground effect. The source model (Ref. 4) appears as:

$$f_G = 1 - \frac{R^2 \cos^2\theta_w}{16(h + H_R)^2} \quad (16)$$

where, $$\cos^2\theta_w = \frac{(-wC_T + vC_z)^2}{(-wC_T + vC_z)^2 + (uC_T + vC_x)^2} \quad (17)$$

The tip path plane angle $\alpha$ and the aircraft pitch angle $\theta$ are effectively equivalent for the purposes of aircraft control. The collective pitch, computed using blade element theory (Ref. 2), appears as $$\delta_c = \frac{\left(1 + \frac{3}{2}\mu^2\right)\left(\frac{6C_T}{a\sigma}\right) + \frac{3}{2}\lambda\left(1 - \frac{1}{2}\mu^2\right)}{\left(1 - \mu^2 + \frac{9}{4}\mu^4\right)} \quad (18)$$

where $\sigma$ and $\alpha$ are the rotor solidity ratio and rotor blade two dimensional lift curve slope respectively. The advance ratio $\mu$ is defined as $$\mu = \frac{u\cos\alpha + w\sin\alpha}{\Omega R} \quad (19)$$

The Optimal Autorotation Problem Formulation

A direct method of optimization was used following the work done by Carlson in Ref. 7. In the direct method the two-point boundary value problem is transformed into a parameter optimization problem. In such a formulation the states and controls are the parameters to be solved satisfying the dynamics and other physical limitations at discrete points in time (nodes), which can be solved using standard non-linear programming methods and software. The direct collocation method is used where both the rotorcraft states and controls are discretized throughout time and the rotorcraft equations-of-motion are imposed as a set of non-linear equality constraints at each point in time (or node). Based on the experience documented in Ref. 7, this method has a better convergence radius with a wider range of initial guesses (more robust to initial guess values) than other parameterization methods. The disadvantage of this method is that the dimension of the problem becomes large due to the discretization of the states and control at each node or point in time. As in Ref. 8, the parameter optimization problem was solved using the Sequential Quadratic Programming (SQP) algorithm as implemented in the SNOPT software package (Ref. 15).

The Constraints On Solution of the Problem (a) Equality Constraints
  1. Initial Value Constraints
    States: $(0, u_0, \Omega_0, h_0, 0, P_0)$
    Controls: $(C_{T_0}, \alpha_0)$
  2. Final Value Constraints
    States: $(\infty, \infty, \infty, 0, \infty, \infty)$
  3. Equations of Motion at each node (b) Inequality Constraints
  1. State Constraints
    $-w_{max} \leq w \leq w_{max}$
    $0 \leq u \leq \infty$
    $\Omega_{min} \leq \Omega \leq \Omega_{max}$
    $0 \leq h \leq \infty$
    $0 \leq d \leq \infty$
    $0 \leq P_s \leq \infty$
  2. Controls Constraints:
    $C_{T_{min}} \leq C_T \leq C_{T_{max}}$
    $\alpha_{min} \leq \alpha \leq \alpha_{max}$ The above constraints on states and controls are defined by
  $w_{max} = 60$ fps
  $\Omega_{min} = 0.75\Omega_0$
  $\Omega_{max} = 1.05\Omega_0$
  $\alpha_{min} = -20$ deg
  $\alpha_{max} = 34$ deg where, $\alpha_{min}$ and $\alpha_{max}$ are chosen as the minimum and maximum pitch values observed in flight test data (Refs. 16 and 17). $C_{T_{min}}$ and $C_{T_{max}}$ are aircraft-specific, with $C_{T_{min}}$ associated with the minimum collective pitch, and $C_{T_{max}}$ associated with blade stall. Also, to impose realistic collective range, the collective bounds are implemented such that:

$$\delta_{col_{min}} \leq \delta_{col} \leq \delta_{col_{max}}$$

The conversion between $\delta_{col}$ and $C_T$ has been performed via Eq. (18) and an iterative method based on trim estimation. The constraint on the pitch angle near the ground has been imposed to prevent the tail from hitting the ground. The constraint is the function of aircraft geometry, such as the tailboom length, and altitude, and, as a result, the optimal solution guarantees that the aircraft's tail doesn't hit the ground at the final touchdown.

The Objective Function

The objective function is the sum of weighted penalties consisting of forward speed and sink rate at the final touchdown as well as the control rates for thrust coefficients and tip path angles at each node. The minimization of control rates provides smoother and consistent behavior of optimal solutions.

$$J = Q_1 \sum_{i=1}^{N-1} \left[ \frac{C_T(i+1) - C_T(i)}{\Delta t} \right]^2 + Q_2 \sum_{i=1}^{N-1} \left[ \frac{\alpha(i+1) - \alpha(i)}{\Delta t} \right]^2 + Q_3 (u_{t_f})^2 + Q_3 (w_{t_f})^2 \quad (20)$$

where, i is the node number (where i=1 is the first node at t=0) and $Q_i$ represents proper weighting factors that is selective for best performance.

Validation of the algorithm using flight data was presented previously (Ref. 18) and showed that the optimal trajectories computed with this formulation were reasonable when compared with those accomplished by an expert pilot in flight tests.

The Flare Law

In real-time application for automated autorotation, performance differences between the rotorcraft dynamics and the point-mass model used in the optimization as well as simulation timing issues cause a mismatch in the altitude predicted by the optimization algorithm and the actual altitude of the rotorcraft (simulation, in this case). During initial development it was noticed that this mismatch caused the rotorcraft to flare too early or too late. To compensate for these deficiencies, a flare law was devised that would take over from the optimal guidance at a pre-determined altitude near the ground and flare the rotorcraft based on a more conventional compensatory control law. In practical terms, this flare law attempted to recreate the final flare and landing performed by a pilot based on outside visual cues. The purpose of the optimal trajectory was to bring the rotorcraft to a pre-flare altitude at an energy condition that was conducive to a safe flare and landing.

The flare law is preferably activated at a height of approximately 30 ft above ground and uses a non-linear algorithm to modulate airspeed through rotorcraft pitch attitude and to modulate rotor-speed and sink-rate through collective control. The activation altitude required some adjustment during development and evaluation to compensate for the variations in aircraft weight.

Brief Description of the Simulator

Development and evaluation of the automatic autorotation and autorotation flight director display of the present invention took place on a commercial helicopter Flight Training Device (FTD) manufactured by Frasca International, Urbana, Ill. Although not officially certified, the FTD used for the evaluation incorporated a level of fidelity necessary for achieving FAA Certification as a Level 4 FTD. The FTD was a fixed-base simulation of a Bell-206L-4 single-turbine, single rotor helicopter (FIG. 1) with a realistic reproduction of the cockpit with a frame and dual controls and a dome visual system with 180-deg horizontal and 60-deg vertical visual field-of-view (FIG. 2). An additional graphics channel provided visual imagery immediately below the cockpit door and through the chin window on the pilot's side. The cockpit controllers were replicas of the actual cyclic, collective and pedal controls and had realistic feel.

Complete engine failures could be triggered from the simulator operator's station at any time. Engine failures resulted in immediate loss of all engine power and the activation of appropriate warning lights and audio alarms. A low-rotor RPM warning light was also provided. The rotorcraft simulation model was a rotor disk model with aerodynamic models for the fuselage and empennage surfaces. The rotorcraft model had previously been evaluated by line pilots as part of the FTD acceptance testing and found to be representative of the actual aircraft in the regular and autorotation flight regimes. The primary development pilot for this project, Ed Bachelder, an experienced helicopter pilot (SH-60B pilot) also found the rotorcraft simulation to be realistic.

Implementation of the Optimal Guidance Algorithm

With reference to FIG. 3, a block diagram indicates how a laptop personal computer (PC) running the real-time optimization algorithm was linked with the Frasca simulation computer.

The PC used for the development and evaluation of the optimal guidance was a conventional commercial laptop PC with a 2 GHz Intel Pentium® processor and a Windows 2000® operating system. The PC accepted rotorcraft state and control information at a nominal 30 Hz data rate and output collective, cyclic, and pedal control positions to the simulation computer, also at a 30 Hz data rate. Communication was facilitated through an Ethernet link using standard Microsoft Windows compatible communication protocol. During powered flight, the optimal algorithm continuously updated the optimal solution based on the rotorcraft states (primarily speed and altitude) being received from the simulation computer. In effect, the optimizer continuously computed an updated optimal trajectory for autorotation with the assumption that an engine failure had just occurred. Typically, a new update was available every 3 sec or sooner. Initially, when an engine failure occurred, the automatic autorotation guidance was based on the last optimal trajectory update that was available. As presently implemented, the optimal trajectory is updated throughout the autorotation maneuver. The optimal guidance algorithm considers only the optimal trajectory in the longitudinal axis (collective and longitudinal cyclic commands only). During the development and evaluation process a simple compensatory feedback control was implemented to maintain roll attitude and heading via lateral cyclic and pedal commands.

During the development and evaluation process a guidance display was generated on the laptop computer to provide an indication of how well the helicopter was following the optimal guidance during automatic autorotations. For piloted operations of actual working aircraft, such as with a remote operator, the display is used as a flight director to guide the operator on the optimal control timing and magnitude inputs required to accomplish a safe landing. The guidance display includes a novel display concept that guides a human operator in following and performing the optimal control inputs by providing a preview of the complete trajectory.

The primary intent of the development and validation of the optimal guidance algorithm in this real-time simulation environment was to evaluate the robustness of the guidance algorithm across the flight envelop of the simulated helicopter. Invariably, however, emphasis was placed on the "worst case" flight conditions; i.e., entry into autorotation from flight conditions that are well within the "avoid" region of the height-velocity diagram for this helicopter (shown in FIG. 4) as these clearly illustrate the benefit of the optimal guidance provided by the present invention. Development and refinement of the optimal guidance algorithm and its real-time mechanization at flight conditions within the "avoid" region of the H-V diagram also maximizes the probability that the guidance provided by the present invention will enable safe autorotations from flight conditions outside the avoid region. The majority of the development and evaluation of the optimal guidance and the flight director display was performed at a vehicle light-weight condition with limited evaluations at the vehicle heavy (maximum gross weight) and medium weight conditions.

The optimal control algorithm uses a simple point-mass type model for the rotorcraft. For the algorithm to provide appropriate autorotation guidance, therefore, it was necessary to fine-tune the point-mass model parameters such that the dynamics and performance of the point-mass model approximated the rotorcraft model as implemented in the simulator as closely as possible. For automated autorotations, it was particularly important to scale and bias the optimal control inputs computed by the optimal algorithm so that it would be able to backdrive the simulation correctly. An automated procedure was setup using Matlab® to facilitate this parameter optimization process using rotorcraft state and control time history data obtained from the simulator.

The Simulator Results

Following three-week period of development on the Frasca FTD in Urbana, Ill., the automatic autorotation capability was refined to an extent that allowed evaluation of the algorithm over a range of autorotation entry conditions. The entry conditions that were attempted at light (2900 lbs), medium (3500 lbs), and heavy (4450 lbs) vehicle weight configurations using the automatic autorotation guidance are presented on a height-velocity diagram in FIG. 5. The manufacturer's height-velocity "avoid" regions are indicated in FIG. 5 by dashed lines labeled for the rotorcraft's weight. Successful landings are shown as open or clear symbols and crash landings are shown as solid or filled 1 symbols. Crash landings represent those where the touchdown sink-rate or forward speed exceeded the manufacturer's specified limitations for the rotorcraft. Tail-strikes were also counted as crash landings. The determination of a safe or crash landing was made by the Frasca simulation software.

As may be observed with reference to FIG. 5, it is clearly established that using the optimal guidance of the present invention, safe autorotations are possible from well inside the "avoid" regions of the H-V curve including the high-speed region. Fewer evaluations were conducted at the medium and heavy vehicle weight conditions. At the heavy and medium vehicle weight conditions, it is expected that refining the constraints (rotor-speed and vertical speed limits, for example) as well as the flare law parameters would have allowed greater success than was demonstrated during the course of development and evaluation of the algorithm. Nevertheless, safe landings were accomplished at these weight conditions from well within the "avoid" regions of the H-V curve for these weights, although not with the consistency that was achieved at the light-weight condition.

The touchdown sink-rates and forward speeds for all the automated autorotation entry conditions shown in FIG. 5 are presented in FIG. 6 (light-weight condition) and FIG. 7 (medium and heavy weight conditions). FIGS. 6 and 7 indicate that, in most situations, touchdown conditions were well within the limitations of the rotorcraft. Almost all the landings were accomplished with some forward velocity. This is especially true in the heavy and medium weight conditions. This is primarily due to the use of the flare law for the landing. Examination of the optimal solutions for these evaluations indicated that if the helicopter had been landed using the optimal algorithm (assuming the aforementioned technical difficulties were resolved), the forward velocities at touchdown would have been reduced.

Selected representative time histories for the automated autorotations are presented in FIGS. 8, 9, 10, and 11 for the light weight condition and FIG. 12 for the heavy-weight condition. In each of these examples, the engine is failed at time t=0 and the displayed time history is ended when touchdown is registered by the simulation computer. FIGS. 8 and 9 demonstrate the extreme nature of the maneuver that is required when autorotating from a hover at 200 ft and 400 ft altitude (above ground level). FIGS. 8 and 9 demonstrate that it is possible to autorotate safely from well within the avoid region of the H-V curve, if the control inputs are well-timed and of appropriate magnitude. At the lower entry altitude (FIG. 8), immediate nose down pitch attitude of approximately 30 degrees is commanded whereas collective is lowered to zero over a period of roughly 3 sec following engine failure. A pitch pull-up is commenced at an altitude of approximately 100 ft continuing into a landing flare using pitch attitude and collective input at approximately 50 ft altitude. The sharp discontinuity in the longitudinal cyclic at approximately 50 ft altitude marks the transition from the optimal algorithm to the flare law. Rotor speed is maintained above 80% throughout most of the maneuver with rotor speed reducing to 60% at touchdown as rotor speed is sacrificed to reduce the touchdown sink rate. No attempt was made to refine the algorithm to smoothly transition between these modes, hence the sharp discontinuity. Modification of the algorithm and/or the flare law to smooth the transition between these modes is within the skill of one of ordinary skill in the art and is within the scope of the present invention.

With reference to FIG. 8, the longer maneuver time allowed by the higher entry altitude is evident. The collective is lowered immediately but there is no command to push the nose over or pitch down and gain airspeed until the rotor-speed approaches its lower constraint of 75%. To maintain rotor speed above the constraint of 75%, the optimal guidance algorithm trades altitude for airspeed and for maintaining rotor speed. With reference to FIG. 9, a maximum nose-down pitch attitude of 40 degrees is observed. A run-on landing is achieved at a forward speed of approximately 20 kts and a touchdown sink rate of almost zero.

FIG. 10 demonstrates the effectiveness of the optimal guidance algorithm for an entry condition in the high-speed "avoid" region of the H-V curve. Due to the low altitude, the flare law almost immediately overrides the optimal algorithm. The helicopter is commanded to pitch up and trades airspeed for rotor-speed and altitude, placing it in a suitable energy state for a safe flare and touchdown at a forward speed of less than 10 kts. FIG. 11 demonstrates an autorotation from an entry condition that is outside the manufacturer's recommended avoid region of the H-V curve for the light-weight condition. In response to the optimal guidance commands, the helicopter initially pitches nose-up to reduce airspeed followed by nose-down pitch to gain airspeed and maintain rotor speed above the constraint limit of 75%. Touchdown is achieved at a sink rate of 3 ft/sec and a forward speed of 40 kts.

The capability of the automatic guidance algorithm of the present invention to safely autorotate for the heavy-weight condition is demonstrated in FIG. 12. The engine is failed when the helicopter is at a hover at an altitude of 400 ft above ground. When contrasted with an autorotation from a similar entry condition for the light-weight condition (FIG. 9), the helicopter sinks more rapidly resulting in a shorter flight time.

The optimal guidance commands an almost immediate pushover to gain airspeed (contrast with almost no pitch input for several seconds in FIG. 9) and maintain rotor-speed with a very rapid pull-up to about 35 degrees to arrest sink rate at low altitude. The pull-up results in the rapid increase in rotor-speed to approximately 100% which is traded-off for sink-rate reduction using collective. Touchdown is achieved at a sink rate close to zero and a forward speed of 27 kts. As would be expected the heavier weight conditions proved to leave very little room for computational or timing errors.

The appropriately formulated optimization algorithm of the present invention may be used to provide autorotation guidance in real-time to a rotorcraft. This "automated autorotation" capability is beneficial on unmanned rotorcraft where redundancy for failure management is not necessarily a primary design requirement. The present optimal guidance method has demonstrated a repeatable capability to safely autorotate a helicopter from a variety of entry conditions and a range of weights, even when these entry conditions are well within the avoid region of the height-velocity diagram.

Display Implementation

The present invention relates to a human-operator cueing and training methodology using optimal control for application to the time critical maneuvering of dynamic systems including vehicles. The methodology can also be used for automated guidance of dynamic systems through time critical maneuvers. The description of the invention uses a particular application example of rotorcraft pilot training and automatic guidance. FIG. 13 illustrates the invention when applied for training rotorcraft pilots on autorotation and reduced-power flight using a flight simulator. In this application (FIG. 13), a standard PC with the invented system installed is linked with a flight simulator and accepts rotorcraft state and control information from the connected flight simulator. Communication uses an Ethernet link using standard Microsoft Windows compatible communication protocol. During powered flight, the optimal algorithm continuously updates the optimal solution based on current rotorcraft states being received from the simulation computer. Thus the optimizer continuously computes an updated optimal trajectory for autorotation with the assumption that an engine failure had just occurred. Typically, a new update is available within a couple of seconds. When an engine failure occurs, the automatic autorotation guidance is based on the last optimal trajectory update that was computed. The optimal algorithm considers only the optimal trajectory in the longitudinal axis (collective and longitudinal cyclic commands only).

Figure 14:
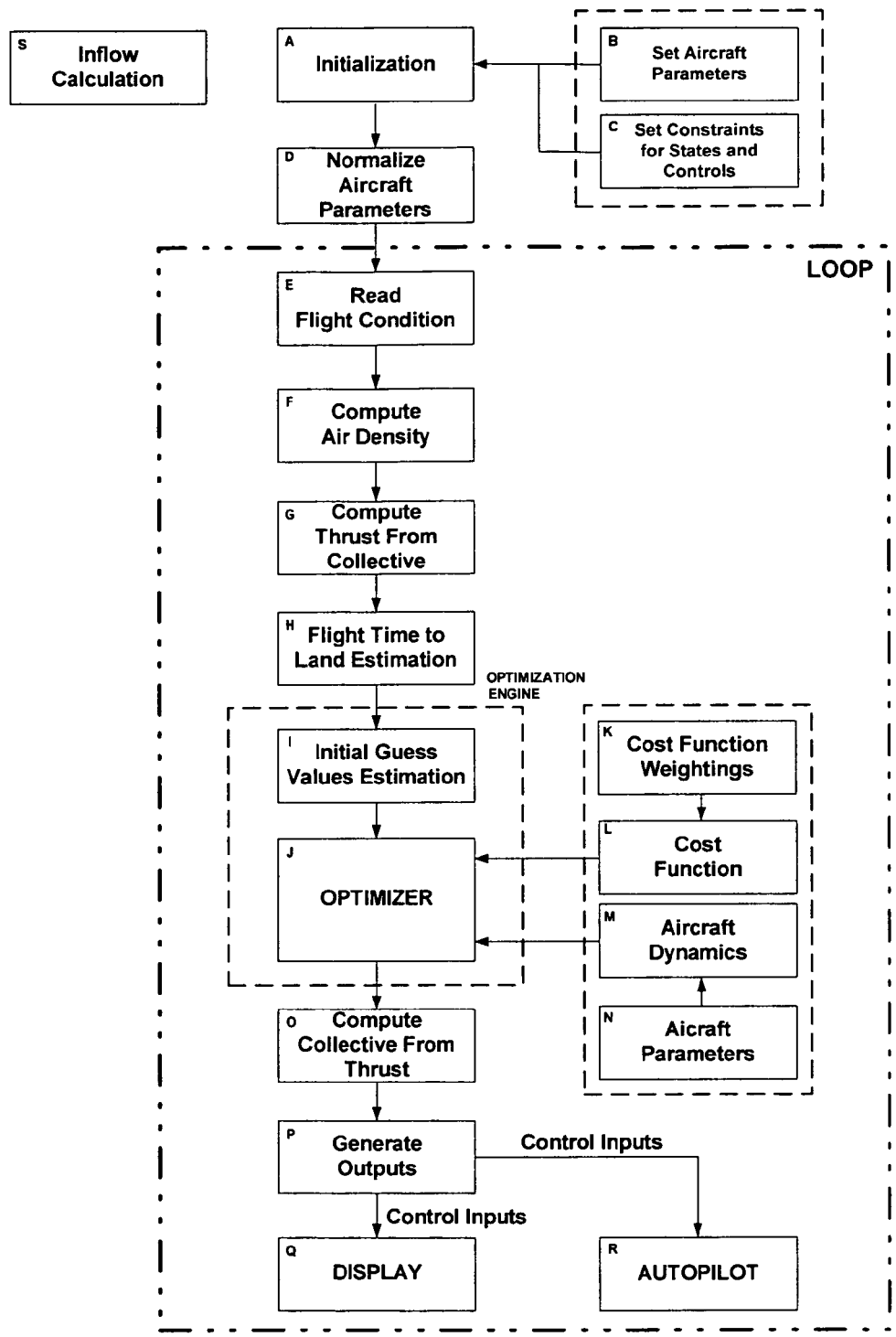
FIG. 14 is a diagram depicting a system schematic of the current invention.

FIG. 14 describes the software implementation of the optimal algorithm as a flowchart. The software starts with initializing all necessary rotorcraft parameters and setting all necessary constraints and costs to compute the optimal controls. The parameters are vehicle specific so that they can be adjusted for different vehicles and dynamic systems—a rotorcraft in this application. Next, the current flight conditions as well as the current environmental information such as wind, weight changes, and atmospheric temperature changes to computes air density are read into the software. The rotorcraft collective control input position from the flight simulator is converted to thrust that is used in the rotorcraft dynamic model to compute optimal controls. The software also estimates the best guess values of optimal controls to facilitate the computation of the optimal guidance solution. After the software finishes the computation, it converts the optimal thrust solution to collective and cyclic control inputs that can be displayed on the guidance display.

Figure 15:
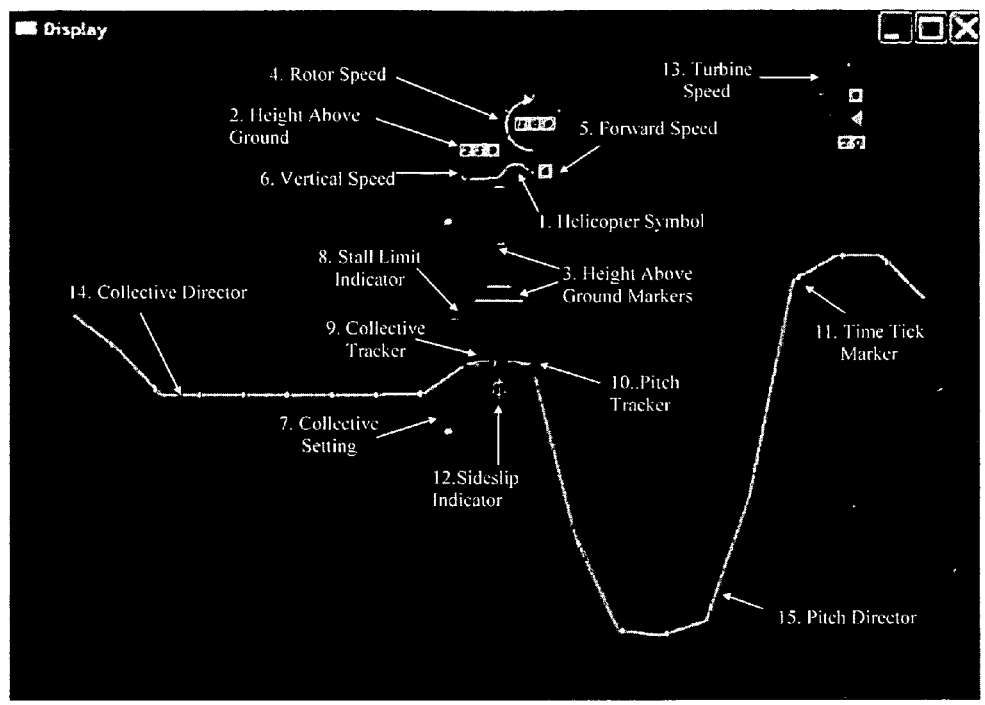
FIG. 15 is a diagram depicting a description of guidance visual display components as a part of the current invention.

A guidance display is also generated on the PC that provides a preview of the optimal control solution with time and facilitates tracking of the optimal solution by the pilot through the maneuver. To learn the optimal control inputs necessary for safe recovery from the power-loss or reduced-power situation, the pilot simply has to track the guidance lines as discussed below. Repeated flights on a flight simulator using this guidance will provide the pilot with a clear understanding of the control inputs and rotorcraft trajectory to be flown for safe recovery. FIG. 15 illustrates the guidance display.

With reference to FIG. 15, the rotorcraft or helicopter symbol (1) is denoted by a stylized graphic intended to be readily recognized as a side view of a helicopter and the key aircraft states are anchored to this symbol to facilitate rapid mental processing as the symbol moves on the display. The helicopter symbol (1) also pitches with the helicopter pitch. The dimensions of the helicopter symbol (1) are drawn to scale with the altitude axis so that the pilot can see when tail contact is imminent and the relation between tail height and pitch.

With further reference to FIG. 15, the helicopter tail acts as a pointer to the radar altimeter readout (2). The radar altimeter readout (2) is preferably positioned behind or aft of the helicopter symbol (1) on the display. A series of short horizontal lines arrayed vertically or stacked below the helicopter symbol (1) is an altitude pipper or height above ground markers (3) which indicate the height-above-ground by short horizontal lines or markers corresponding preferably to heights of 150, 80, 40, 20, 10, and 0 feet. If the helicopter is above 150 feet (as in FIG. 15), the helicopter symbol (1) will remain fixed at the 150 feet marker until the altitude goes below 150 feet, at which point the helicopter symbol (1) begins descending. A rotor speed indicator (4) includes a rotary pointer and digital readout box that is positioned above the helicopter symbol (1). The rotor speed indicator (4) changes from steady to blinking if the rotor speed falls below 90% or rises above 110%. A forward speed indicator (5) emanates and extends as a (body-axis referenced) vector from the nose of the helicopter symbol (1). The length of the vector (5) is in direct proportion to the forward speed of the helicopter. The forward speed readout in knots is tagged to the head of the forward speed indicator vector (5). A vertical speed indicator (6) vector (ground referenced) emanates and extends vertically downward from the tail of the helicopter symbol (1). The vertical speed vector (6) originates from the tail since this is the natural point of interest for that state. The forward and vertical speed vectors are shown in FIG. 15. The scales on the vertical and forward speeds are identical and dimensioned with respect to the radar altimeter (i.e., 10 fps corresponds to a 10 foot increment on the altimeter (2)). The ticks on the vertical speed vector correspond to 5 fps, while on the forward speed bar ticks denote 10 knots increments. It is to be noted that the lengths of these vectors are scaled so that the pilot can weigh them equally. When the vertical speed vector touches the ground reference marker (attitude pipper), there is one second remaining prior to tail contact (based on the current vertical speed), at which time the pipper blinks in intensity to alert the pilot of the impending contact. This unique feature results from the scaling chosen, allowing the pilot to refine control timing.

With continued reference to FIG. 15, a collective range setting indicator (7) scale is positioned on the display to the left of the altitude pipper or height above ground markers (3). The white ticks on the collective indicator (7) denote the 0% and 100% collective positions. The rotor blade stall limit indicator (8) (red bar) shows the collective setting corresponding to the blade stall limit at that particular point in time, and it varies considerably throughout the autorotation. The collective range setting indicator (8) moves correspondingly with the collective inputs from the pilot. A left-pointing triangle (9) positioned below the altitude pipper (3) and to the right of the collective indicator (7) points to and tracks the current collective position. If this collective tracker pointer (9) nears or exceeds the rotor blade stall limit, it will change from a steady preferably white color to blinking alternating colors to alert the pilot that lift will be lost. One aspect of the maneuver that is almost never considered in autorotation training is the stall limit (presumably because one can't see it or predict it with the standard instrument layout), but it easily exceeded, to the detriment of the maneuver. This limit is predicted based on the point-mass helicopter model. The pointers are fixed in the display to allow the pilot better tracking. The collective range indicator moves with the collective input from a pilot so that the pilot can have a clear idea of his current collective input and the overall possible range of collective movements. A right-pointing triangle (10) positioned below the altitude pipper (3) and to the right of the collective tracker pointer (9) points to and tracks the current pitch position. The white right-pointing triangle below the altitude pipper points to the current pitch position. For example, the pilot should follow the pitch commands displayed in FIG. 15 with the pitch tracker pointer (10). Time marks (11) are displayed on the optimal collective and pitch commands as tick marks for every second to give a pilot a better preview of overall profiles and the anticipated time remaining to complete maneuver.

Referring further to FIG. 15, the sideslip indicator (12) is shown below the attitude pipper as a ball referenced to a fixed vertical centerline. The sideslip indicator ball will move to the right or left with respect to the nominal centerline in response to corresponding sideslip. The engine turbine speed indicator (13) is shown on the upper right of the display as a rotary pointer and digital readout box for displaying percent of turbine maximum speed. Guidance commands to the collective (left white line) and pitch (right white line) are displayed as time profiles for the collective director (14) command suite and pitch director (15) command suite, with a time tick for every second. The contact points with the collective and pitch pointers represent the present time or time equal to zero. The command profile lines indicate the anticipated time to complete autorotation in seconds. These profile lines move in time so that the collective command profile scrolls right and the pitch command profile scrolls towards the left. The pilot must move the controls to minimize the vertical separation between the current control setting (left collective tracker pointer (9), right pitch tracker pointer (10)) and the coincident command. A crucial advantage that the present display has over the more traditional flight director is that the pilot is given a highly usable view of future control motion and time. Using this preview the pilot can anticipate control motion as well as anticipated time to complete maneuver, which is critical to precise and timely control tracking. The optimal commands will change from steady color to blinking with a different color when the "auto flare law" would be activated if the autopilot mode were in use. In this way, a pilot will be alerted to prepare for the landing flare. The color of the optimal commands change to denote the quality of optimal solutions. Due to the rapid changes of entry conditions and numerical complexity associated with the optimization algorithm the optimal solution might not have converged. In this case, the optimal commands change color to indicate that the commands are not based on a converged solution, in which case the displayed commands are from the last solution that converged.

Figure 16:
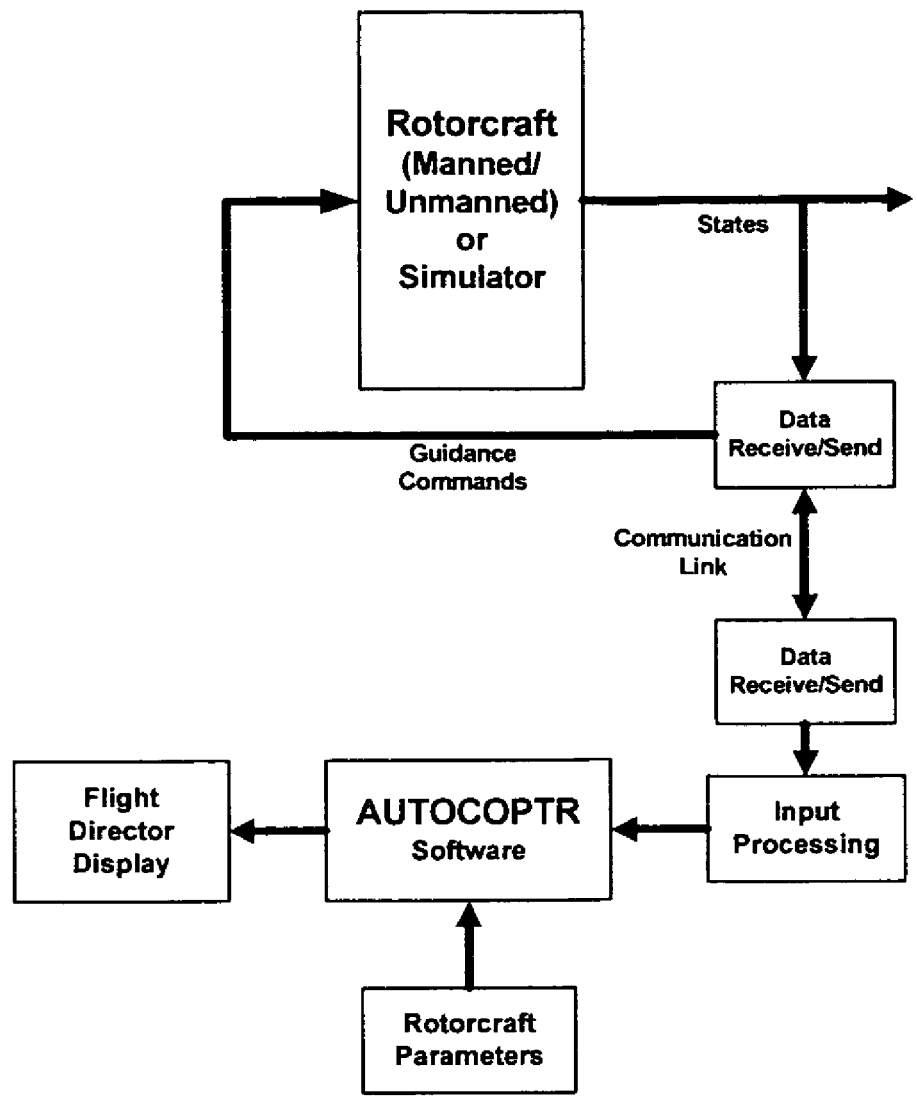
FIG. 16 is a diagram depicting a schematic illustration of a second embodiment of the current invention adapted for automatically guiding a manned or unmanned rotorcraft.

FIG. 16 illustrates the application of the invention to automatic control of a vehicle or dynamic system (a rotorcraft in the example application). The implementation is similar to that indicated in FIG. 13 except that the optimal control solutions are fed back to the flight simulator or actual vehicle and used to replace the normal control inputs. The optimal solution will then guide the simulator or actual vehicle to a safe recovery from the power-loss or reduced-power situation. When acting as an automatic guidance and control system, a compensatory feedback control law is also implemented to maintain roll attitude and heading via lateral cyclic and pedal commands and the system sends the optimal control commands to the simulator to drive the simulator for safe landing in autorotation. A separate flare algorithm takes over near the ground to compensate for possible differences in the rotorcraft dynamics between the system and the simulator.

Figure 17:
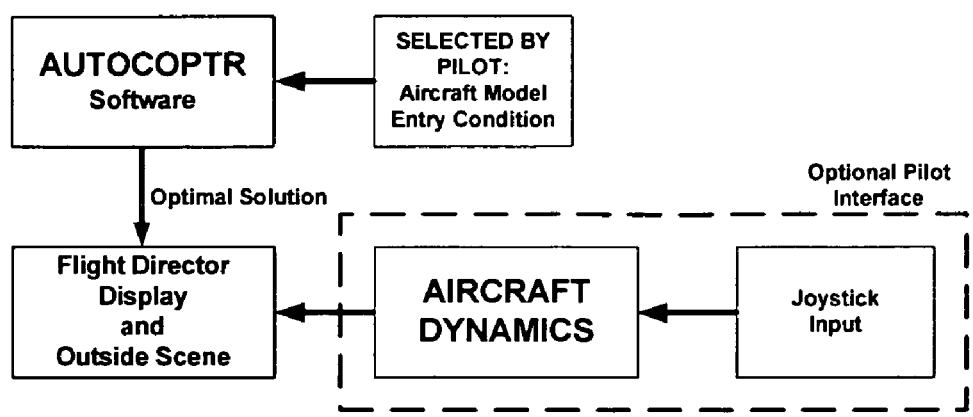
FIG. 17 is a diagram depicting a schematic illustration of a third embodiment of the current invention adapted as a computer-based training device for autorotation/reduced-power emergency flight.

FIG. 17 illustrates the application of the invention to a computer-based training device for rotorcraft autorotation and reduced-power emergency flight situations. The basic operation of the algorithm follows that depicted in FIG. 14 except that there is no connection with a simulation or flight vehicle. The optimal solution is displayed to the trainee pilot and the simulated rotorcraft together with a computer-generated scene of the pilot's view out of the rotorcraft. When activated by the trainee pilot, the simulated rotorcraft follows the computed optimal trajectory, providing the trainee pilot with an understanding of the rotorcraft attitudes, path and control inputs necessary for safe recovery. The software will allow the trainee pilot to adjust the rotorcraft initial and final conditions and examine the effect of these conditions on the optimal solution.

In order to give the pilot proficiency at entering the autorotation profile, simulated engine failure is initiated at various altitudes, airspeeds, and horizontal locations relative to a geographically fixed landing site. This will exercise the full envelope of entry conditions without the pilot having to indicate to the computer the intended point of touchdown. The display also may be used as an on-board pilot preview of the optimal autorotation maneuver strategy. As the helicopter readies for departure from a hover, the autorotation computer will begin computing the optimal inputs and display them. The pilot would include the display in his instrument scan so that if the engine were to fail at any given time an image of the control profile would be mentally available. The entry into the autorotation would therefore be executed precognitively, followed by scanning of the autorotation display and cockpit instruments during the steady-state phase (if there is one) and just prior to the flare. In instances where out-of-balance flight is required, (to prevent site overshoot, rotor overspeed, or to compensate for other conditions) the pedal control profile will command appropriately so that the pilot may develop skill in slipping the helicopter according to the situation.

The training display concept of the present invention where the operator is provided with visual cues on where to place the controls at the current instant as well as provide a preview of where the controls should be in the future (based on the optimal algorithm) has application to any vehicle or device that requires time-critical inputs for safe operation. Employing trajectories and control inputs using constrained optimization can be applied to any vehicle or device that requires time-critical inputs for safe operation.

The concepts, algorithms and routines for implementing the real-time dynamic visual display methodology of the present invention are further disclosed and described in the following Table 1 which provides representative examples, in a common programming language, of computer code capable of implementing the primary portions, but not the entirety, of the visual display of the present invention in a suitable computer processing environment. Table 1 is a listing of the computer code for the DrawDisplay.CPP display guidance-commands and flying information routine of the Guidance-Commands Display and Communication Module of the computer implementation of the present invention.

The scope of the appended claims will be clear from the entirety of the present disclosure. It will be obvious to those of ordinary skill in the art that the concepts, algorithms and displays of the present invention may be implemented in alternative code formulations and/or in other programming languages and such alternative formulation or formulations are within the scope of the present invention.

Thus, a real-time trajectory optimization method for guiding a rotorcraft in the event of loss of engine power is described in conjunction with one or more specific embodiments. The invention is defined by the following claims and their full scope of equivalents.

What is claimed is:

1. A computer implemented method for guiding a pilot of a rotorcraft in simulated autorotation from a current state of simulated flight having a constrained optimal trajectory for autorotation to landing comprising the steps of:
    (a) determining the current state of the rotorcraft;
    (b) executing a guidance algorithm to compute the current constrained optimal trajectory of the rotorcraft for autorotation to landing;
    (c) executing the guidance algorithm to compute inputs for rotorcraft collective and pitch controls required to achieve the current optimal trajectory;
    (d) providing a visual guidance display including:
        (i) a symbol for the rotorcraft indicating the current pitch of the rotorcraft;
        (ii) a symbol representative of collective control position required to achieve the current optimal trajectory;
        (iii) a symbol representative of the current collective control position;
        (iv) a symbol representative of the pitch control required to achieve the current optimal trajectory; and
        (v) a symbol representative of the current pitch control;
    (e) providing the pilot visual cues where to currently position the collective control and the pitch control to follow the current optimal trajectory;
    (f) providing the pilot a visual preview of when and where to position the collective control and the pitch control at future times to follow the current optimal trajectory;
    (g) repeating steps (b) through (e) until landing occurs.

2. A helicopter guidance system for landing a simulated airborne helicopter following a partial or total helicopter engine power failure comprising:
    (a) state input signals representative of a current state of the helicopter;
    (b) control input signals representative of a current set of controls for the helicopter;
    (c) a helicopter guidance algorithm;
    (d) a computer adapted to:
        (i) receive the state input signals;
        (ii) receive the control signals;
        (iii) execute the guidance algorithm to compute an optimal current trajectory for a simulated landing of the helicopter;
        (iv) execute the guidance algorithm to compute current trajectory output signals representative of the optimal current trajectory;
        (v) execute the guidance algorithm to compute a set of current controls positioning required for the simulated airborne helicopter to achieve the optimal current trajectory; and
        (vi) execute the guidance algorithm to compute controls positioning output signals representative of the controls positioning required to achieve the optimal current trajectory; and
    (e) a visual guidance display including:
        (i) a symbol for the helicopter;
        (ii) indicators of the state of the helicopter;
        (iii) indicators of the controls positioning of the helicopter;
        (iv) indicators of control inputs required to achieve the optimal current trajectory;
        (v) visual cues for positioning of controls necessary to achieve the optimal current trajectory; and
        (vi) indicators of future positioning of controls required to achieve the optimal current trajectory.

3. The helicopter guidance system of claim 2 in which the symbol for the helicopter is a representation of a side view of the helicopter and of the head and of the tail of the helicopter.

4. The helicopter guidance system of claim 2 in which the indicators of the state of the helicopter are anchored to the symbol for the helicopter.

5. The helicopter guidance system of claim 2 in which the symbol for the helicopter is adapted to pitch with the pitch of the helicopter during landing.

6. The helicopter guidance system of claim 2 further including a series of horizontal lines representative of an altimeter readout as one of the indicators of the state of the helicopter.

7. The helicopter guidance system of claim 2 further including a rotary pointer and numerical display as indicators of the helicopter's rotor speed.

8. The helicopter guidance system of claim 3 further including a variable length vector extending from the symbol of the helicopter head as one of the indicators of the helicopter's forward speed.

9. The helicopter guidance system of claim 3 further including a variable length vector extending from the helicopter tail as one of the indicators of the helicopter's vertical speed.

10. The helicopter guidance system of claim 2 further including a collective range setting indicator scale and a collective indicator as indicators of the position of the collective relative to 0% and to 100% collective positions.

11. The helicopter guidance system of claim 10 further including a rotor blade stall limit indicator corresponding to the helicopter's rotor blade stall limit.

12. The helicopter guidance system of claim 2 further including a time line representative of collective guidance commands for collective position over time as one of the indicators of control inputs required to achieve the optimal current trajectory.

13. The helicopter guidance system of claim 2 further including a time line representative of pitch guidance commands for pitch position over time as one of the indicators of control inputs required to achieve the optimal current trajectory.

* * * * *